Patented Dec. 5, 1950

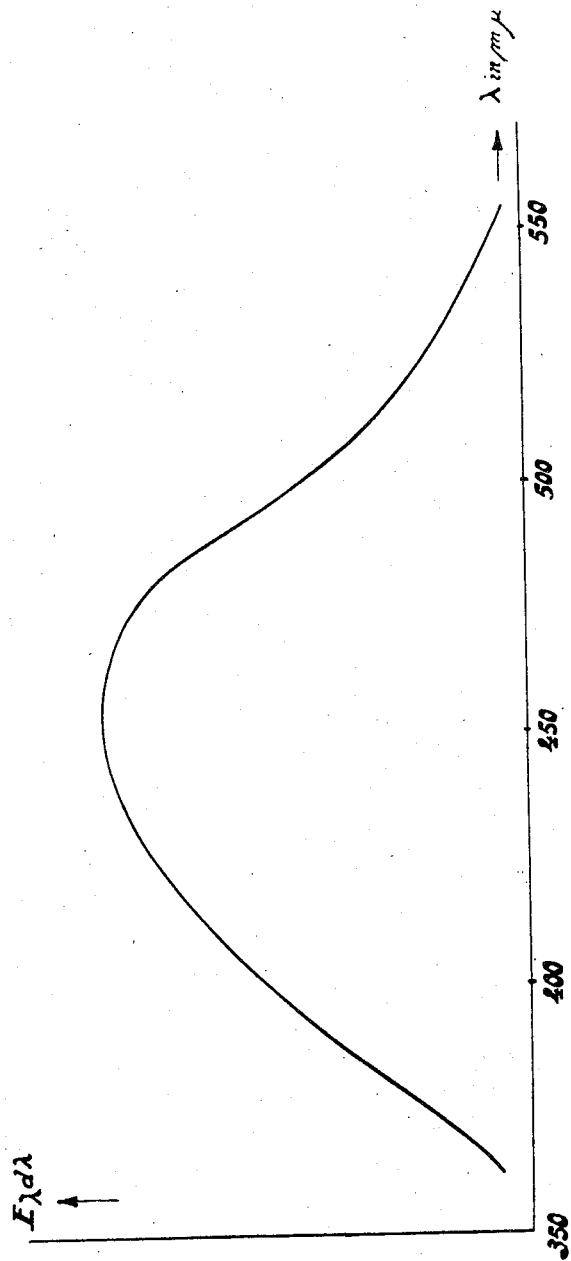

2,532,774

UNITED STATES PATENT OFFICE 2,532,774

MAGNESIUM SILICATE TITANATE PHOSPHOR

Ferdinand Anne Kröger and Jan Broos, Eindhoven, Netherlands, assignors, by mesne assignments, to Hartford National Bank and Trust Company, Hartford, Conn., as trustee Application January 16, 1946, Serial No. 641,594
In the Netherlands July 22, 1942

Section 1, Public Law 690, August 8, 1946
Patent expires July 22, 1962

5 Claims. (Cl. 252—301.4)

This invention relates to an electric discharge tube comprising a fluorescent screen and to a method of preparing materials for use in such screens.

In addition to the well-known screens with a fluorescent material giving a blue luminescence, of which calcium tungstate and zinc sulphide activated with silver are most important, there is a need for a screen capable of converting the energy of impinging electrons into blue light with a high efficiency.

An electric discharge tube according to the invention comprises a fluorescent screen with a material substantially built up of magnesium oxide, silicon dioxide and titanium dioxide, the proportions being such that, calculated in mols, the quantity of titanium dioxide relatively to the sum of the quantity of titanium dioxide and silicon dioxide lies between 0.001 and 0.40, the quantity of magnesium oxide relatively to the sum of the quantity of silicon dioxide and titanium dioxide being comprised between 1.4 and 0.25.

The general formula of such a material may read: $XMgO.YSiO_2.ZTiO_2$. According to the invention the quantities of the constituents of this material are chosen in such a manner that, as has been stated above $$\frac{Z}{Y+Z}$$

lies between 0.001 and 0.40, and $$\frac{X}{Y+Z}$$

between 1.4 and 0.25.

The above mentioned material may be conceived as a mixed silicate-titanate of magnesium.

In regard to various well-known materials the material used in electric discharge tubes according to the invention has the important advantage that the conversion of the energy of impinging electrons into blue light takes place with a high efficiency.

A material used in a discharge tube according to the invention contains mixed crystals of magnesium silicate-titanate which exhibit the same structure (clino-enstatite structure) as magnesium metasilicate in its stable form. However, this magnesium silicate has only a weak emission under bombardment by electrons.

In the accompanying table the grid spacings calculated from the angles of deflection of the reflections on X-ray diagrams according to Debye-Scherrer are stated in the first column. By replacing a part of the silicon by titanium the grid constants are not altered; solely the intensities of the various lines of diffraction stated in columns 2 to 5 inclusive of the table, undergo some modification. In column 2 is stated the intensity of the various lines of the magnesium meta-silicate according to observations by W. Büssem and C. Schusterius, and in column 3 those according to observations by the inventors. In column 4 is stated the intensity of magnesium silicate-titanate, in which the total quantity of magnesium titanate amounts to 10 mol. per cent. Column 5 stating the quantity of magnesium titanate 20 mol. per cent. Intensities of the lines of diffraction on X-ray powder recorded according to Debye-Scherrer.

| $d=\frac{\lambda}{2\sin\theta}$ | $MgSiO_3$ clino enstatite according to Büssem Schusterius | $MgSiO_3$ clino enstatite according to the inventors | $MgSiO_3$, $MgTiO_3$, 90–10 mol per cent | $MgSiO_3$, $MgTiO_3$, 80–20 mol per cent |
|---|---|---|---|---|
| 4.97 |  | m | z | m. |
| 4.42 | zz | zz | z | z. |
| 4.07 | z | zz | z | z. |
| 3.50 | zzz | zz | z | st. |
| 3.30 | st | st | m | m. |
| 3.18 | zst | st | st | st. |
| 2.98 | st | zst | zst | zst. |
| 2.88 | zst | zst | zst | zst. |
| 2.76 | zz | zz | z | st. |
| 2.54 | st | st | m | m. |
| 2.45 | st | zst | st | st. |
| 2.21 | z+ | m | z | z. |
| 2.12 | zst | zst | st | st. |
| 2.02 | z+ | m | z | z. |
| 1.97 | z | z | z | m. |
| 1.93 | z+ | m | z | zz. |
| 1.86 | zzz | zz | zz | z. |
| 1.75 | z | z | z | z. |
| 1.65 | z | z | z | z. |
| 1.61 | zst | zst | st | st. |
| 1.53 | st | st | m | m. |
| 1.49 | m | m | m | m. |
| 1.47 | st | st | m | m. |
| 1.37 | zst | zst | st | m. |
| 1.36 | z | z | z | z. |
| 1.32 | zz | z | m | m. |
| 1.26 | st | m | m | m. | z=weak
m=medium
st=strong
zz=very weak
zst=very strong
zzz=extremely weak.

In an electric discharge tube according to the invention a luminescent material is preferably used whose ratio $$\frac{Z}{Y+Z}$$

lies between 0.05 and 0.30, the ratio $$\frac{X}{Y+Z}$$

lying between 1.0 and 0.8. In fact, the materials in this range exhibit the highest efficiency upon conversion of electron energy into light.

The drawing illustrates the spectral distribution of the emitted light in regard to a material whose ratio X : Y : Z corresponds to 100 : 75 : 25.

In a screen for use in a tube according to the invention the blue fluorescent material may, if desired, be mixed with other luminescent materials emitting, for instance red light, in another part of the spectrum.

In a method also forming part of the invention a mixture of magnesium oxide, silicon dioxide and titanium dioxide or of compounds, from which these oxides may be formed by heating, is heated in a non-reducing medium. The heating operation preferably takes place in an oxidizing atmosphere such as air or oxygen. In this case the temperature at which it is heated may be chosen below or above the melting point of the luminescent material.

A suitable product is obtained, for instance, by heating 100 gram mol. of MgO, 90 gram mol. of $SiO_2$ and 10 gram mol. of $TiO_2$ at a temperature of about 1350° in an oxygen atmosphere or in air.

For adding the silicon dioxide use is preferably made of ethylsilicate ester dissolved in alcohol.

The two executional examples given below of a method according to the invention elucidate the preparation of the fluorescent materials.

*Example I*

A solution of 50 gms. of MgO in diluted acetic acid is mixed with 30.6 ccs. of a hydrochloric solution of pure titanium hydroxide (content 65.3 gms. of titanium dioxide per litre) and 42.3 ccs. of a solution of ethyl-silicate in alcohol (content 141.8 gms. of silicon per litre). This mixture is poured into ammonia, the obtained reaction mixture is vaporised to dryness on a water-bath and the dry material thus obtained is heated for some hours to 500° C. in air. After that the material is still heated for some hours at about 1350° C. in oxygen.

*Example II*

A colloidal solution of 1 gm. of freshly precipitated pure titanium dioxide in ice acetic acid is mixed with a solution of 5 gms. of MgO in diluted acetic acid and 47.6 ccs. of a solution of ethylsilicate in alcohol (content 141.8 gms. of silicon dioxide per litre). This mixture is poured into ammonia vaporised to dryness on a water-bath and the dry product is heated for some hours at a temperature of 500° in the air. The product thus obtained is still heated for some hours at about 1350° C. in air.

What we claim is:

1. A crystalline fluorescent material consisting of the fired reaction product of magnesium oxide, silicon dioxide, and titanium dioxide, said constituent oxides being present in the ratios in gram molecules $Z : (Y+Z)$ between about 1 : 1000 to about 4 : 10 and $X : (Y+Z)$ between about 14 : 10 to about 25 : 100 wherein X represents the magnesium oxide constituent, Y represents the silicon dioxide constituent and Z represents the titanium dioxide constituent.

2. A crystalline fluorescent material consisting of the fired reaction product of magnesium oxide, silicon dioxide, and titanium dioxide, said constituent oxides being present in the ratios in gram molecules $Z : (Y+Z)$ between about 5 : 100 to about 3 : 10 and $X : (Y+Z)$ between about 1 : 1 to about 8 : 10 wherein X represents the magnesium oxide constituent, Y represents the silicon dioxide constituent and Z represents the titanium dioxide constituent.

3. A crystalline fluorescent material consisting of the fired reaction product of magnesium oxide, silicon dioxide, and titanium dioxide, said oxides being present respectively in the ratios of 100 : 90 : 10 by molecular weights.

4. The method of preparing a fluorescent material comprising the steps of forming a mixture comprising silicon dioxide, titanium dioxide and magnesium oxide, the constituents of said mixture being in the ratios in gram molecules $Z : (Z+Y)$ between about 5 : 100 to about 3 : 10 and $X : (Y+Z)$ between about 1 : 1 and 8 : 10 wherein X represents the magnesium oxide constituent, Y represents the silicon dioxide constituent and Z represents the titanium dioxide constituent, heating said mixture for two to five hours at a temperature above its melting point in an oxidizing atmosphere, and cooling said mixture to produce a crystalline luminescent material.

5. The method of preparing a fluorescent material comprising the steps of forming a mixture comprising silicon dioxide, titanium dioxide, and magnesium oxide the constituents of said mixture being in the ratios in gram molecules $Z : (Z+Y)$ between about 5 : 100 to about 3 : 10 and $X : (Y+Z)$ between about 1 : 1 and 8 : 10 wherein X represents the said magnesium oxide constituent, Y represents the silicon dioxide constituent and Z represents the titanium dioxide constituent, heating said mixture for two to five hours at a temperature just below the melting point thereof in an oxidizing atmosphere, and cooling said mixture to produce a crystalline luminescent material.

FERDINAND ANNE KRÖGER.
JAN BROOS.

REFERENCES CITED

The following references are of record in the file of this patent:

UNITED STATES PATENTS

| Number | Name | Date |
|---|---|---|
| 2,171,145 | Leverenz | Aug. 29, 1939 |
| 2,252,500 | Fonda | Aug. 12, 1941 |
| 2,254,956 | Aschermann | Sept. 2, 1941 |
| 2,269,819 | Isenberg | Jan. 13, 1942 |
| 2,298,947 | Leverenz | Oct. 13, 1942 |
| 2,415,129 | Froelich | Feb. 4, 1947 |
| 2,473,960 | Kroger | June 21, 1949 |